United States Patent
Everaert (10) Patent No.: US 11,555,970 B2
(45) Date of Patent: *Jan. 17, 2023

(54) TELECOMMUNICATION ENCLOSURES

(71) Applicant: CommScope Technologies LLC, Hickory, NC (US)

(72) Inventor: Valja Everaert, Wetteren (BE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,691

(22) Filed: Jun. 18, 2021

(65) Prior Publication Data

US 2021/0389529 A1 Dec. 16, 2021

Related U.S. Application Data (60) Continuation of application No. 16/887,379, filed on May 29, 2020, now Pat. No. 11,041,998, which is a division of application No. 16/124,305, filed on Sep. 7, 2018, now Pat. No. 10,684,426.

(60) Provisional application No. 62/556,098, filed on Sep. 8, 2017.

(51) Int. Cl.
| | | |
|---|---|---|
| G02B 6/36 | (2006.01) | |
| G02B 6/38 | (2006.01) | |
| G02B 6/44 | (2006.01) | |

(52) U.S. Cl.
CPC ......... *G02B 6/3897* (2013.01); *G02B 6/3877* (2013.01); *G02B 6/3891* (2013.01); *G02B 6/4452* (2013.01); *G02B 6/4471* (2013.01); *G02B 6/4479* (2013.01); *G02B 6/3874* (2013.01); *G02B 6/3894* (2013.01)

(58) Field of Classification Search
CPC .. G02B 6/3897; G02B 6/4471; G02B 6/4452; G02B 6/3877; G02B 6/3891; G02B 6/4479; G02B 6/3874; G02B 6/3894; G02B 6/36

See application file for complete search history.

(56) References Cited

U.S. PATENT DOCUMENTS

| | | |
|---|---|---|
| 5,317,663 A | 5/1994 | Beard et al. |
| 7,397,997 B2 | 7/2008 | Ferris et al. |
| 7,512,304 B2 | 3/2009 | Gronvall et al. |
| 7,572,065 B2 | 8/2009 | Lu et al. |
| 7,844,158 B2 | 11/2010 | Gronvall et al. |

(Continued)

FOREIGN PATENT DOCUMENTS

| | | |
|---|---|---|
| WO | 2008118603 A2 | 10/2008 |
| WO | 2009076364 A2 | 6/2009 |

(Continued)

*Primary Examiner* — Jennifer Doan
(74) *Attorney, Agent, or Firm* — Merchant & Gould P.C.

(57) ABSTRACT

A telecommunication enclosure includes an environmentally sealed housing having an interior volume. The sealed enclosure includes a housing wall defining an opening that extends from the interior to an exterior of the enclosure, the housing wall defining interior threads within the opening. A port-defining element mounts within the opening, the port-defining element defining exterior threads that are threadingly mated with respect to the interior threads to retain the port-defining element within the opening. The port-defining element defines a connector port for receiving a hardened fiber optic connector.

19 Claims, 8 Drawing Sheets

(56) References Cited

U.S. PATENT DOCUMENTS

| | | | |
|---|---|---|---|
| 10,107,437 | B2 | 10/2018 | Wolfe |
| 11,041,998 | B2 * | 6/2021 | Everaert .............. G02B 6/3897 |
| 2015/0219857 | A1 | 8/2015 | Lichoulas et al. |
| 2015/0339499 | A1 | 11/2015 | Nekoogar et al. |
| 2016/0139346 | A1 | 5/2016 | Bund et al. |
| 2019/0041595 | A1 | 2/2019 | Reagan et al. |

FOREIGN PATENT DOCUMENTS

| | | |
|---|---|---|
| WO | 2009089327 A2 | 7/2009 |
| WO | 2016156610 A1 | 10/2016 |

* cited by examiner

TELECOMMUNICATION ENCLOSURES

CROSS REFERENCE TO RELATED APPLICATION

This application is a continuation of U.S. patent application Ser. No. 16/887,379, filed May 29, 2020, now U.S. Pat. No. 11,041,998; which is a divisional of U.S. patent application Ser. No. 16/124,305, filed Sep. 7, 2018, now U.S. Pat. No. 10,684,426; which claims priority to U.S. Provisional Patent Application Ser. No. 62/556,098, filed Sep. 8, 2017, the disclosures of which are incorporated herein by reference in their entireties.

TECHNICAL FIELD

The present disclosure relates to fiber optic cable telecommunication systems. More particularly, the present disclosure relates to multi-service terminals or other types of outside rated environmentally sealed telecommunication enclosures having outside accessible fiber optic connector ports.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

Figure 1:
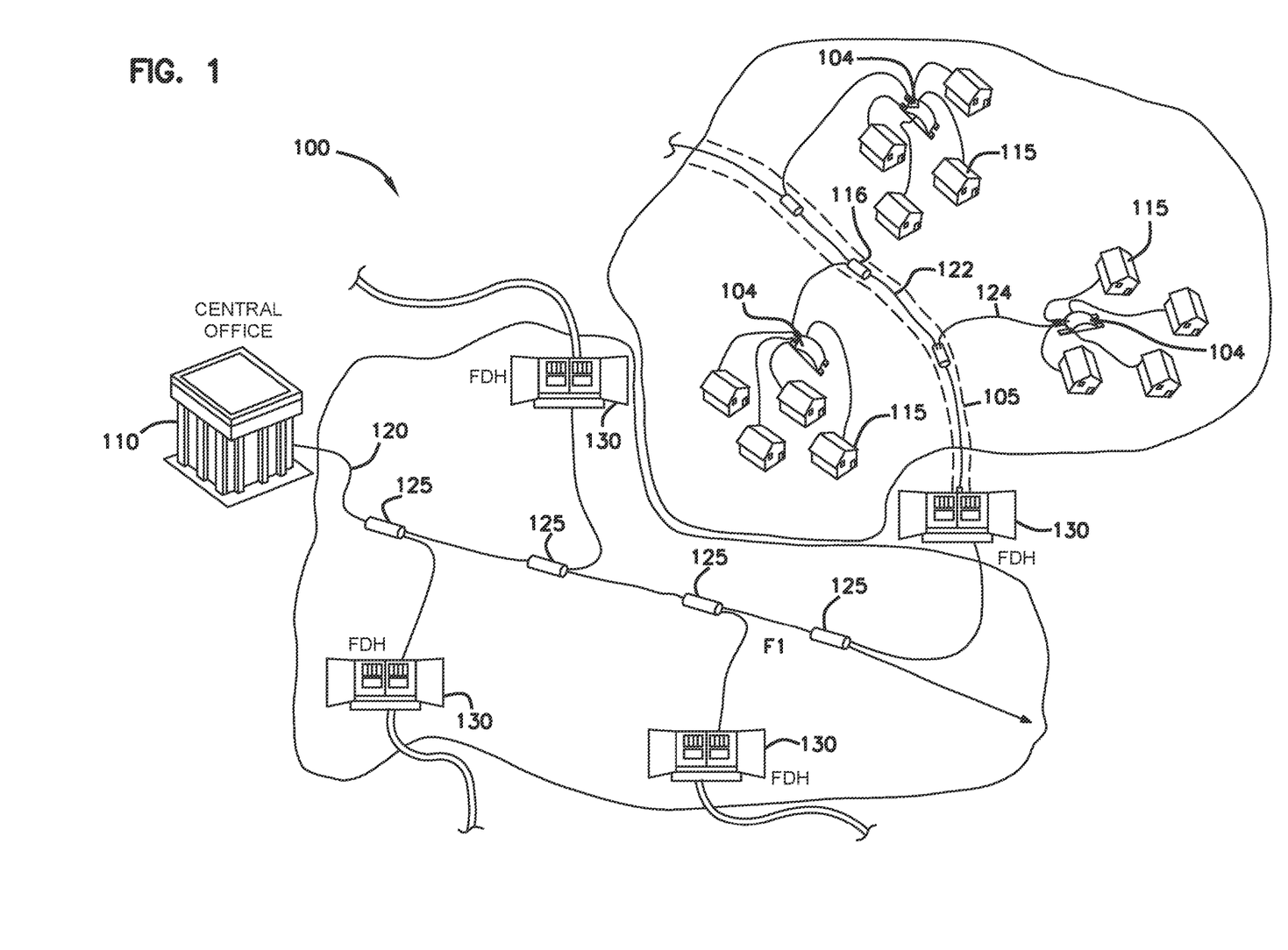
FIG. 1 illustrates an exemplary prior art passive optical network.

FIG. 1 illustrates an exemplary passive optical network 100 adapted to provide fiber-to-the-premises (FTTP). As shown in FIG. 1, the optical network 100 may include a central office 110 that connects a number of end subscriber locations 115 (also called end user locations 115 herein) in a network. The central office 110 may additionally connect to a larger network, such as the Internet (not shown) or a public switched telephone network. The various lines of the network can be aerial or housed within underground conduits (e.g., see conduit 105).

In general, the optical network 100 includes feeder cables (e.g., main cable 120) associated at one end with the central office 110 and from which distribution cables branch. The main cable 120 may have on the order of 12 to 48 fibers; however, alternative implementations may include fewer or more fibers. The portion of network 100 that is closest to central office 110 is generally referred to as the F1 region, where F1 is the "feeder fiber" from the central office.

The optical network 100 may include fiber distribution hubs (FDHs) 130 that receive fibers of the feeder cable 120 extending from splice locations 125 and that output one or more distribution cables 122. In general, an FDH 130 is an equipment enclosure that may include a plurality of optical splitters (e.g., 1-to-8 splitters, 1-to-16 splitters, or 1-to-32 splitters) for splitting the incoming fibers of the feeder cable 120 into a number (e.g., 216 to 432) of output distribution fibers. The distribution cable 122 extends from an FDH 130 to a number of end user locations 115.

The optical network 100 typically includes breakout locations 116 at which branch cables (e.g., drop cables, stub cables, etc.) 124 are separated out from or electrically coupled (e.g., spliced, connectorized, etc.) to distribution cables 122. Breakout locations can also be referred to as tap locations, drop cable locations, splice locations, or branch locations. Branch cables can also be referred to as drop cables, drop lines, breakout cables, or stub cables.

Stub cables 124 are typically routed from breakout locations 116 to intermediate access locations 104 such as a pedestals, drop terminals, or hubs. Intermediate access locations 104 can provide connector interfaces located between breakout locations 116 and the end user locations 115. Drop cables are cables that typically form the last leg to an end user location 115. For example, drop cables can be routed from intermediate access locations 104 to end user locations 115. Drop cables also can be routed directly from breakout locations 116 to end user locations 115, thereby bypassing any intermediate access locations 104.

As noted above, the intermediate access locations 104 may be provided in the form of multi-service terminals such as drop terminals, optical termination enclosures, splice enclosure, etc. Optical termination enclosures are similar to multi-service terminals but are usually more re-enterable and may include splice trays and sealed ports for allowing pass-through cables to be routed through their housings such that the fibers can be accessed within the housings. Examples of multi-service termination are described in further detail in U.S. Pat. Nos. 7,397,997; 7,512,304; and 7,844,158, the entire disclosures of which are incorporated herein by reference. And, examples of optical termination enclosures are described in International Publication No. WO 2009/089327, the entire disclosure of which is incorporated herein by reference.

In certain embodiments, branch cables 124 can be coupled to distribution cables 122 using factory integrated terminations to provide environmentally sound and cost effective splicing protection. Factory integrated terminations may use factory integrated access (tap) points at specified points, such as at breakout locations 116, in the optical network 100 instead of manually installed splices. These factory integrated access points may be connectorized to provide a simple plug and play approach in the distribution portion of the optical network 100 when connecting end user locations 115 to the optical network 100. For example, implementations consistent with the principles of the disclosure may use rugged Outside Plant (OSP) connectors that can accommodate single or multi-port connectors. Examples of hardened or ruggedized fiber optic connectors, i.e., connectors that are adapted for outside environmental use and that may include environmental seals for preventing moisture/water intrusion, are described in International Publication No. WO 2009/076364, the entire disclosure of which is incorporated herein by reference.

SUMMARY

Certain aspects of the disclosure relate to multi-service terminals or other types of outside rated environmentally sealed telecommunication enclosures having outside accessible fiber optic connector ports.

According to one aspect, the telecommunication enclosure of the present disclosure comprises an environmentally sealed housing having an interior volume, the sealed enclosure including a housing wall defining an opening that extends from the interior to an exterior of the enclosure, the housing wall defining interior threads within the opening, and a port-defining element that mounts within the opening, the port-defining element defining exterior threads that are threadingly mated with respect to the interior threads to retain the port-defining element within the opening, the port-defining element defining a connector port for receiving a hardened fiber optic connector.

According to another aspect, the telecommunication enclosure of the present disclosure comprises an environmentally sealed housing having an interior volume, the sealed enclosure including a housing wall defining an opening that extends from the interior to an exterior of the enclosure, the housing wall including a main body portion and a threaded portion defining interior threads within the opening, wherein the main body portion and the threaded portion of the housing wall are integrally formed, and a port-defining element that mounts within the opening, the port-defining element defining exterior threads that are threadingly mated with respect to the interior threads to retain the port-defining element within the opening, the port-defining element defining a connector port for receiving a hardened fiber optic connector.

According to another aspect, the present disclosure is directed to a method of assembling an environmentally sealed telecommunication enclosure, the method comprising threading a port-defining element within an opening defined by the enclosure to form a connector port for receiving a hardened fiber optic connector.

According to certain embodiments of the disclosure, the port-defining element may be threaded to the opening defined by the enclosure from an exterior of the enclosure toward an interior of the enclosure.

According to certain other embodiments, the port-defining element may be threaded to the opening defined by the enclosure from an interior of the enclosure toward an exterior of the enclosure.

A friction-based interference seal may be used between the exterior threads defined by the port-defining element and the interior threads of the housing wall of the enclosure for the environmental seal.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosure herein are based.

DETAILED DESCRIPTION

The present disclosure relates generally to multi-service terminals or other types of outside rated environmentally sealed telecommunication enclosures having outside accessible fiber optic connector ports.

Figure 2:
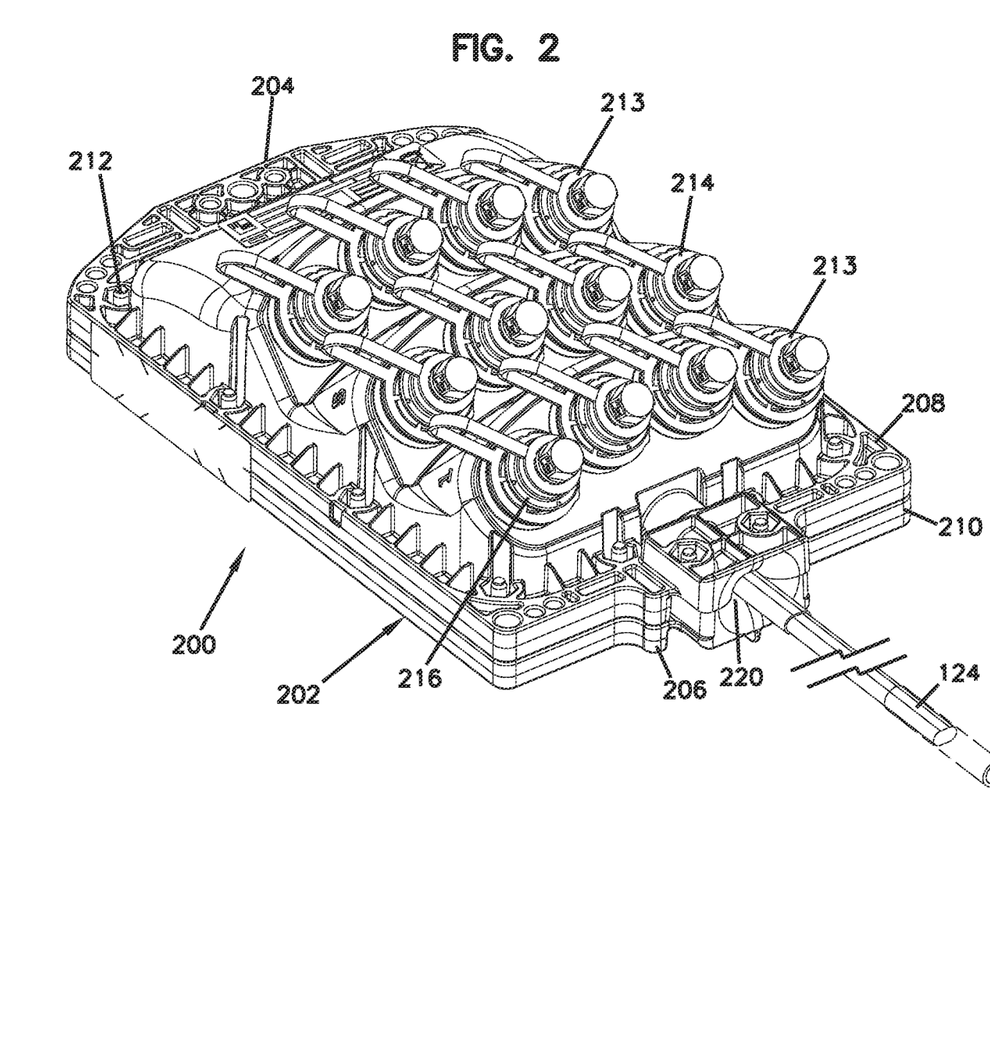
FIG. 2 is a perspective view of a telecommunication enclosure having features that are examples of inventive aspects in accordance with the principles of the present disclosure, the telecommunication enclosure usable in a passive optical network such as that shown in FIG. 1.
Figure 3:
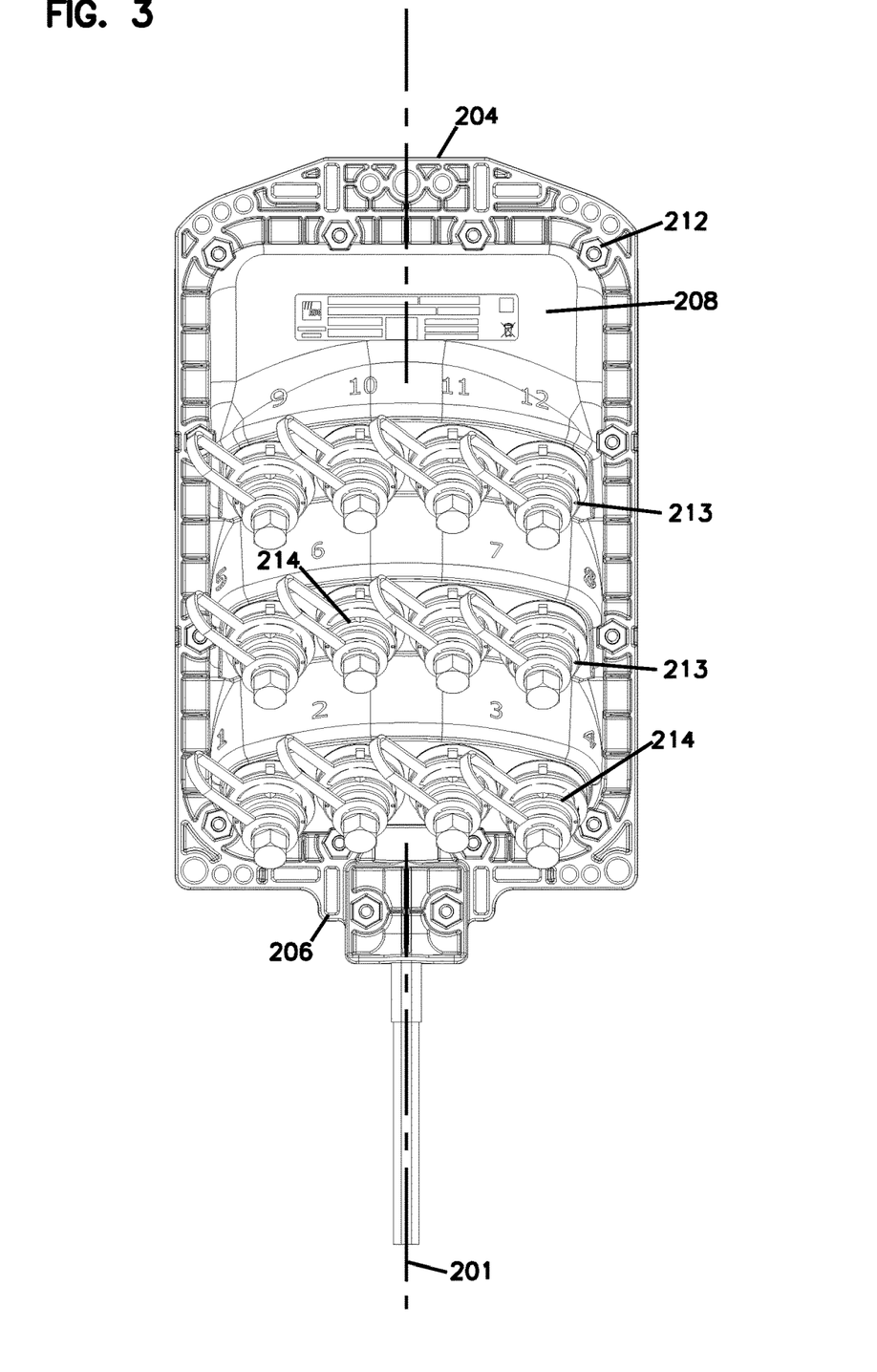
FIG. 3 is a front view of the telecommunication enclosure of FIG. 2.
Figure 4:
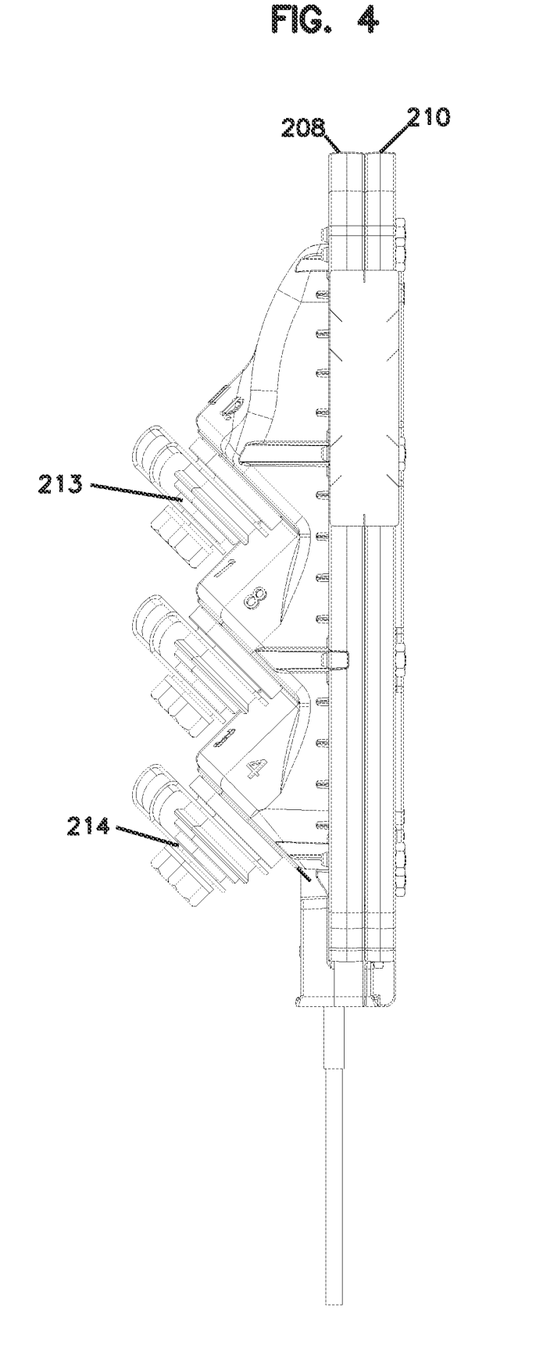
FIG. 4 is a side view of the telecommunication enclosure of FIG. 2.

FIGS. 2-4 illustrate an example of a multi-service terminal 200 (e.g., drop terminal, optical termination enclosure, splice enclosure, etc.) having features that are examples of inventive aspects in accordance with the principles of the present disclosure.

The depicted terminal or enclosure 200 is adapted for use within a fiber optic network. For example, the terminal 200 can be used at a location such as an intermediate access location 104 shown at FIG. 1. It should be noted that the inventive aspects of the present disclosure are applicable to not only the depicted terminal but also to other types of outside rated environmentally sealed enclosures having outside accessible connector ports. The multi-service terminal 200 illustrated in FIGS. 2-4 is simply one example telecommunication enclosure used to describe the inventive aspects of the present disclosure. Reference can be made to U.S. Pat. No. 7,397,997 for a general description of conventional multi-service terminals, the entire disclosure of which has been incorporated herein by reference.

Referring still to FIGS. 2-4, the terminal 200 includes a main housing 202 formed from a first housing part (i.e., front housing part) 208 and a second housing part (i.e., rear or back housing part) 210 that cooperate to define an enclosed interior for the main housing 202. The front and back housing parts 208, 210 are joined by fasteners 212 (e.g., bolts or other fastening elements such as external latches) spaced about a periphery of the main housing 202. The terminal 200 is generally configured such that the front and back housing parts 208, 210 are elongated along a central axis 201 so as to extend generally from a first end 204 to a second end 206 of the main housing 202.

Still referring to FIGS. 2-4, the terminal 200 also includes port-defining elements 213 mounted to the front housing part 208 of the main housing 202, further details relating to which will be discussed below. According to one embodiment, the port-defining elements 213 are fiber optic adapters 214 that are configured for mating fiber optic connectors. The fiber optic adapters 214 each define an outer port 216

(see FIG. 2) accessible from outside the main housing 202 and an inner port 218 (see FIGS. 5-7) accessible from within the main housing 202.

One example of a port-defining member in the form of an adapter is illustrated and described in U.S. Pat. No. 7,572,065, hereby incorporated by reference in its entirety. Other examples of port-defining members in the form of adapters are illustrated and described in International Publication No. WO 2009/076364, the entire disclosure of which has been incorporated herein by reference.

Still referring to FIGS. 2-4, the second end 206 of the main housing 202 defines a cable port 220 for allowing a fiber optic cable to enter/exit an interior of the main housing 202. As noted above, the drop terminal 200 can be installed at a location such as one of the intermediate access locations 104 of the optical network 100 of FIG. 1. For such an application, the fiber optic cable entering the terminal 200 through the cable port 220 may be a cable such as a stub cable 124 (FIG. 1) routed from a breakout location 116 of a distribution cable 122, and the drop terminal 200 may provide connection locations for connecting subscriber locations to the fiber optic network. For example, the drop terminal 200 can provide easily accessible locations for connecting drop cables to the fiber optic network. In one embodiment, first ends of the drop cables can be plugged into outer ports 216 of the fiber optic adapters 214, and second ends of the drop cables can be plugged into network interface devices at subscriber locations.

Figure 5:
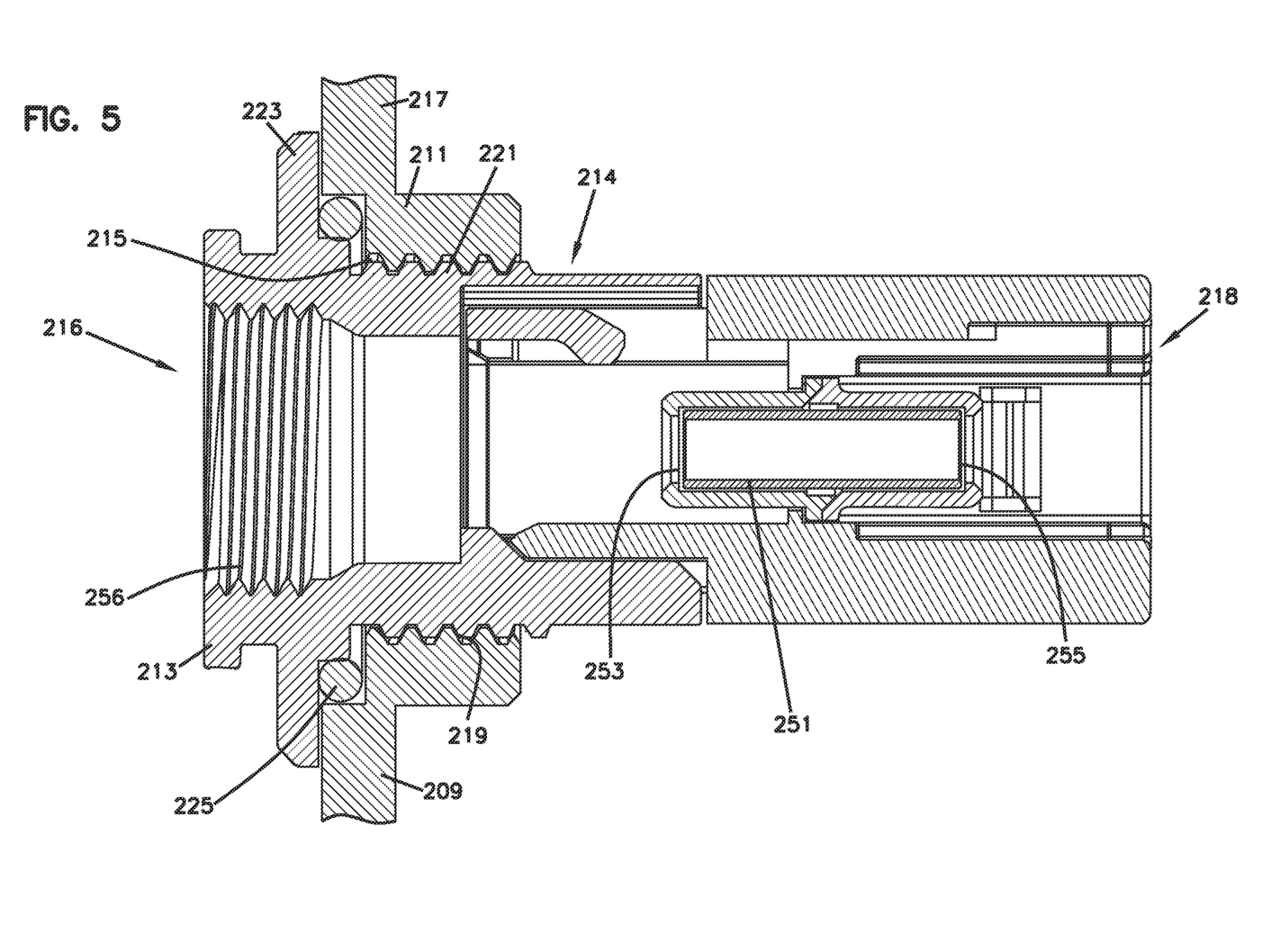
FIG. 5 illustrates a cross-section taken through one of the port-defining elements mounted on the termination enclosure of FIG. 2, wherein sealing is achieved, for example, by, but not limited to, a sealing element in the form of an o-ring. Several other sealing methods are possible as discussed in further detail below.

Referring now to FIG. 5, the port-defining elements 213 (e.g., fiber optic adapters 214) are mounted to openings 215 defined by the front housing part 208. Each of the openings 215 is defined by a wall 217 of the front housing part 208 of the main housing 202 and extends from the interior to an exterior of the main housing 202.

The housing wall 217 defines a main body portion 209 and a threaded portion 211 that is attached fixedly with respect to the main body portion 209. The threaded portion 211 that is non-removably attached to the main body portion 209 defines interior threads 219 within each opening 215 of the enclosure 200.

Each port-defining element 213 defines exterior threads 221 that can be threadingly mated with respect to the interior threads 219 to retain the port-defining element 213 within the opening 215. As shown in FIG. 5, the port-defining element 213 may be threaded within the opening 215 until a flange 223 of the element 213 abuts the housing wall 217.

Figure 5A:
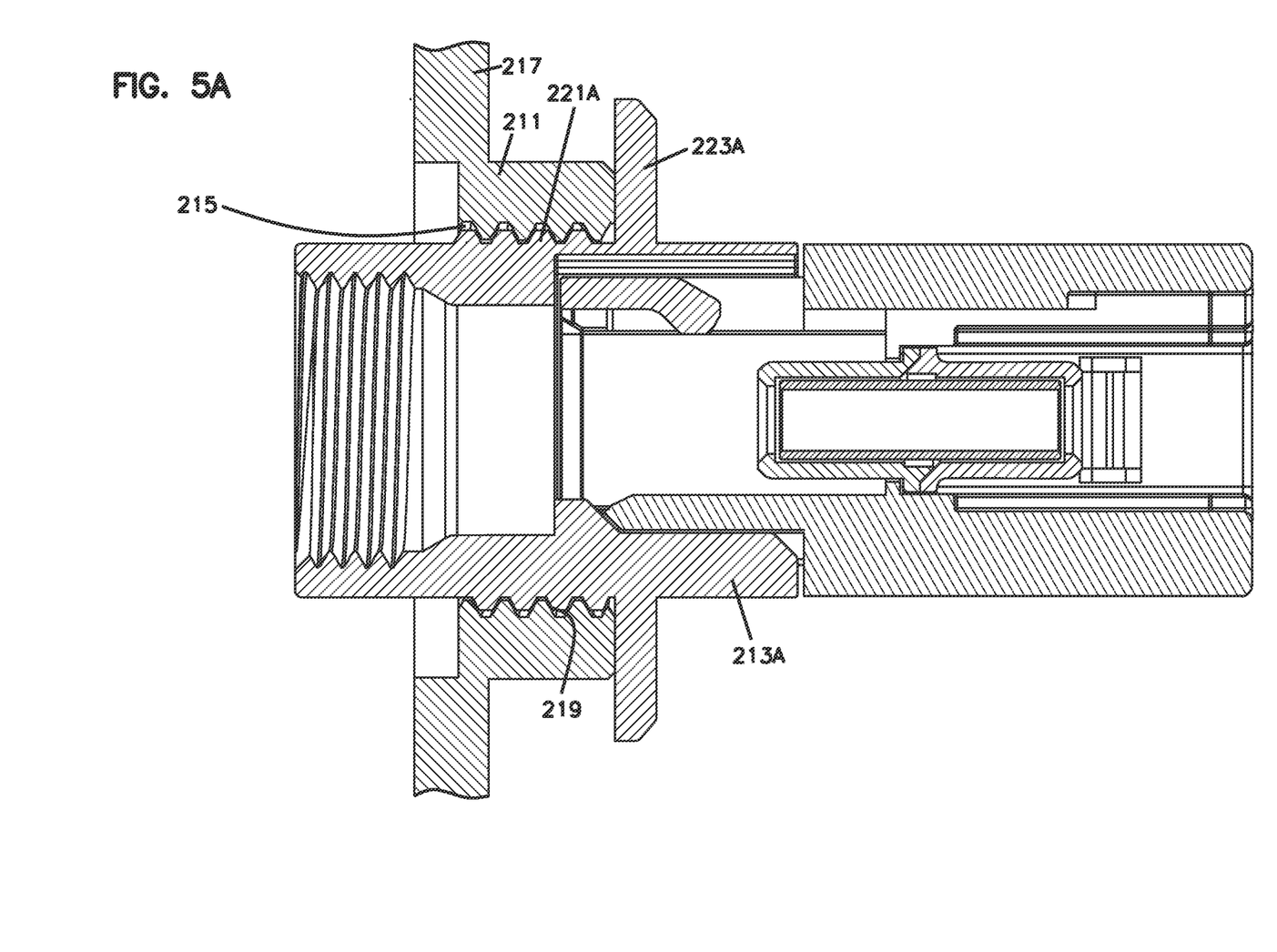
FIG. 5A illustrates a cross-section taken along a line similar to that shown in FIG. 5, wherein the embodiment of the telecommunication enclosure shown in FIG. 5A includes a port-defining element that is mounted to a termination enclosure similar to that shown in FIG. 2 from an interior of the enclosure toward an exterior of the enclosure, and wherein sealing is achieved, for example, by, but not limited to, a friction-based interference seal. Several other sealing methods are possible as discussed in further detail below.
Figure 6:
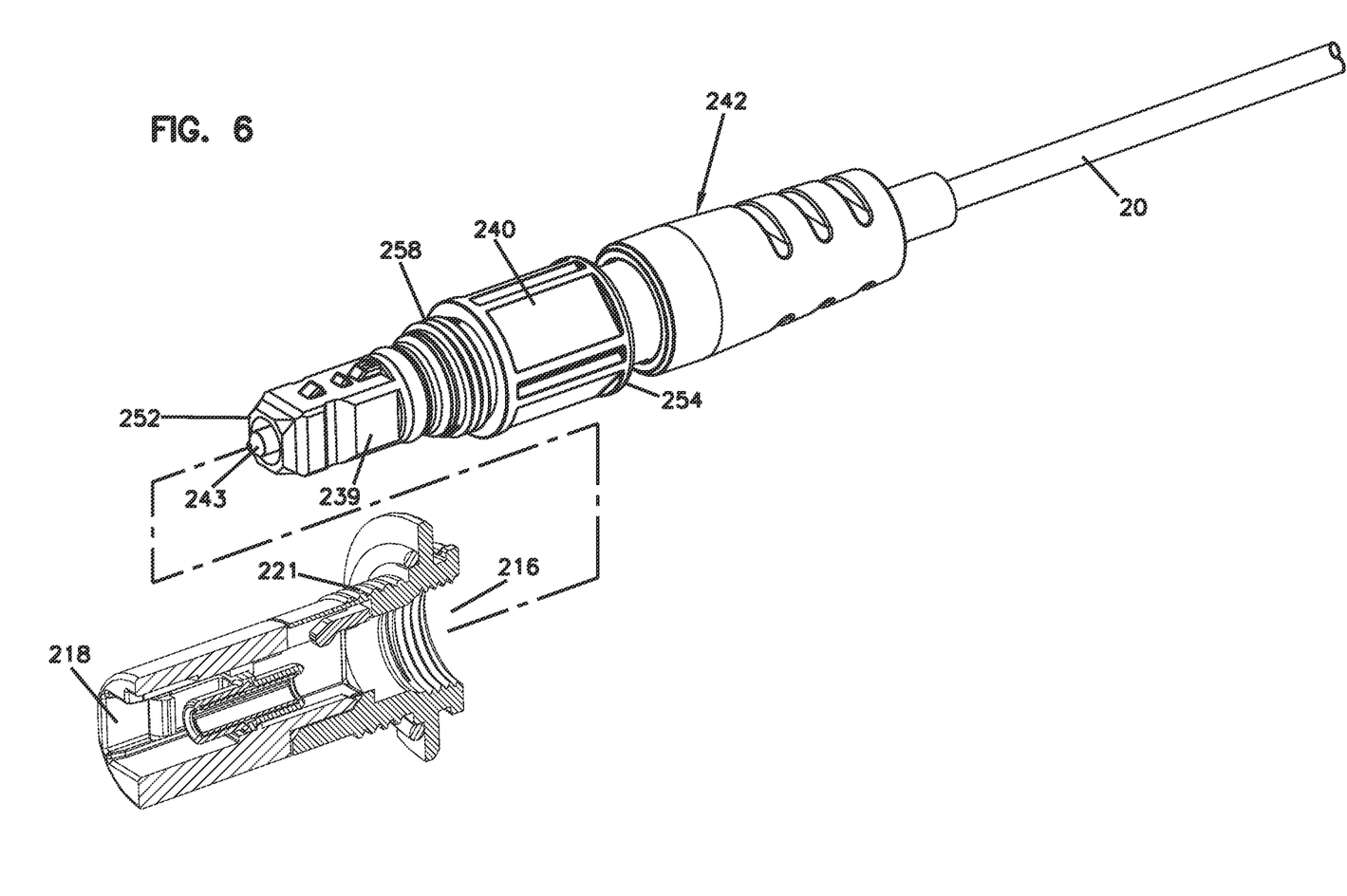
FIG. 6 illustrates the port-defining element of FIG. 5 in isolation, removed from the termination enclosure, with a hardened/ruggedized fiber optic connector to be mated to the port-defining element, wherein the port-defining element is shown with one, non-limiting, example method of providing a seal in the form of an o-ring. Several other sealing methods are possible as discussed in further detail below.
Figure 7:
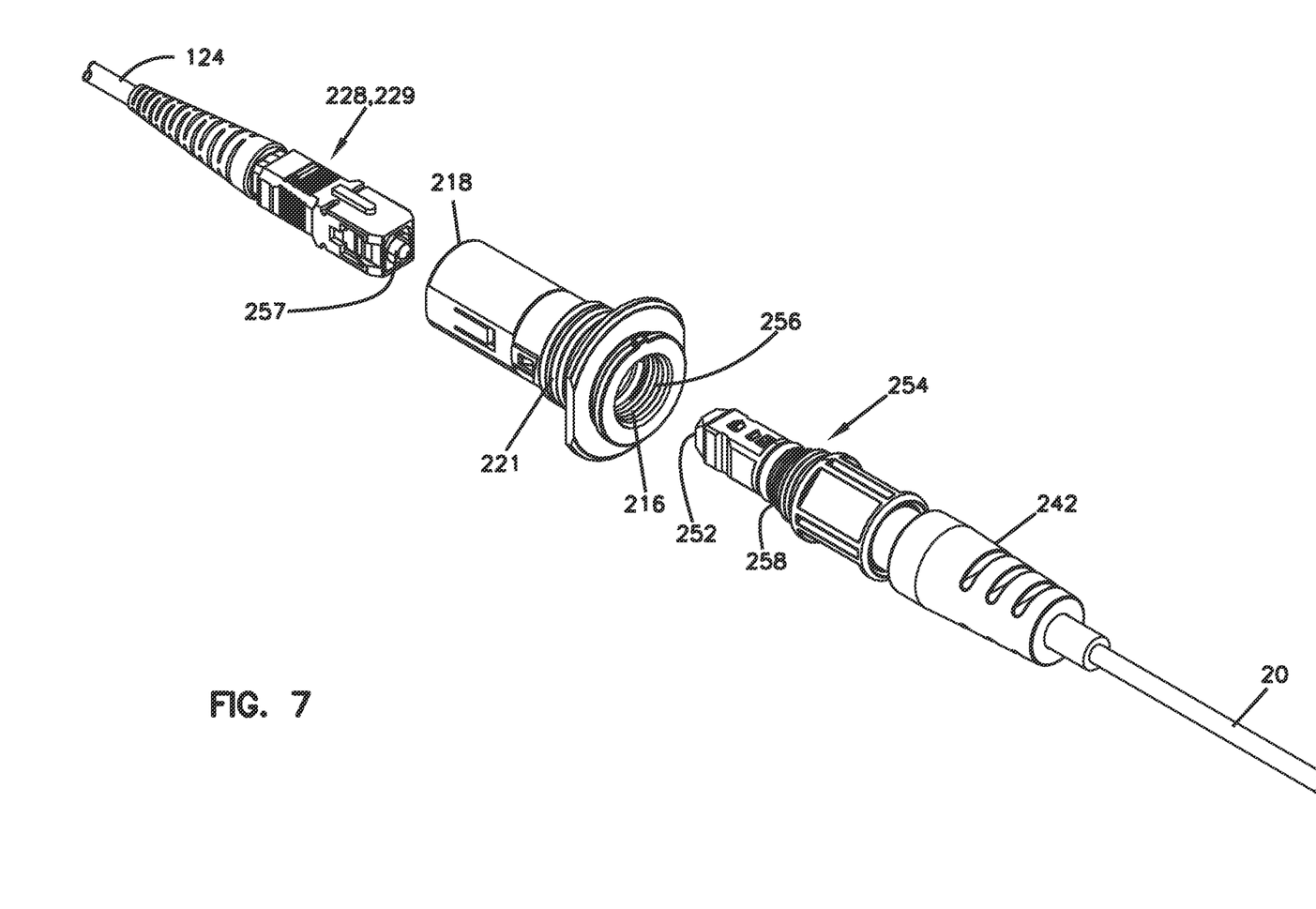
FIG. 7 illustrates the mating of a hardened/ruggedized fiber optic connector, such as that shown in FIG. 6, with a non-hardened fiber optic connector through the port-defining element of FIG. 6, wherein the port-defining element is configured to utilize one, non-limiting, example method of providing a seal in the form of an o-ring. Several other sealing methods are possible as discussed in further detail below.

In certain embodiments, as shown in FIGS. 5-7, a sealing element 225 (e.g., an o-ring) may be compressed between the flange 223 of the port-defining element 213 and the housing wall 217 to environmentally seal the element 213 around the opening 215 of the terminal 200.

In certain embodiments, a sealant may also be provided between the exterior threads 221 of the port-defining element 213 and the interior threads 219 defined by the housing wall 217 for further sealing. An adhesive may also be used between the exterior and interior threads 221, 219 for non-removable coupling between the port-defining element 213 and the terminal 200.

According to certain embodiments, the environmental seal between the opening 215 and the port-defining element 213 may be provided with interference or friction-based sealing between the exterior threads 221 of the port-defining element 213 and the interior threads 219 defined by the housing wall 217. In such examples, where interference sealing is used between the exterior and interior threads 221, 219, a flange such as the flange 223 might not have to be used on the port-defining element 213. A seal formed by interference sealing may still utilize an adhesive or sealant between the exterior and interior threads 221, 219 for additional sealing.

The threaded attachment between the port-defining element 213 and the housing wall 217 may allow the port-defining elements 213 to be mounted from outside the main housing 202 without having to access the inside of the main housing 202. This mounting method facilitates automation during the assembly process. Elimination of a separate adapter mounting nut that has to be threaded to the exterior threads 221 of the port-defining element 213 at an interior region of the main housing 202 reduces costs and enhances the ability to use automation in assembling such enclosures.

Even though in the example depicted in FIG. 5, the port-defining element 213 has been shown to be mounted from outside the main housing 202, and, while this method may facilitate automation during assembly, it is contemplated that the port-defining element 213 may also be threaded to the opening 215 of the terminal 200 from inside the terminal 200 toward the outside of the terminal 200. Such a variation is illustrated in FIG. 5A. As shown, the port-defining element 213A defines exterior threads 221A that mate with interior threads 219 defined by the housing wall 217, where a flange 223A of the port-defining element 213A abuts an interior of the housing wall 217 as the port-defining element 213A is threaded from inside the terminal 200. A flange, such as flange 223A, may not be required in examples where interference sealing is used, as discussed above with respect to version of the port-defining element 213 that is threaded from the outside.

As noted above and as depicted, the main body portion 209 and the threaded portion 211 of the housing wall 217 are integrally formed. It should be noted that the term integrally formed means that the main body portion 209 and the threaded portion 211 are fixedly attached and non-movable relative to each to other, wherein the threaded portion 211 is also non-removable from the main body portion 209. This may be accomplished by fixedly attaching or bonding (e.g., by ultrasonic welding, by adhering, etc.) an element that defines the threaded portion 211 to the main body portion 209 of the housing wall 217. The term integrally formed may also mean that the threaded portion 211 and the main body portion 209 are of monolithic or seamless construction and molded as a single piece.

As long as the threads 219 are accessible from outside (or inside) of the enclosure 200 in mounting the port-defining elements 213, and a separate, removable nut does not have to be used, inventive concepts of the disclosure can be utilized. However, as in the depicted embodiment, a monolithic or seamless constructions, wherein the threaded portion 211 is molded as a single-piece with the main body portion 209 of the housing wall 217, may be advantageous from a manufacturing standpoint.

It should also be noted that, even though the threaded portion 211 of the housing wall 217 has been depicted in FIGS. 5 and 5A as extending inwardly from the main body portion 209 of the housing wall 217 (toward the interior of the terminal 200), in other embodiments, the threaded portion 211 may extend outwardly from the main body portion 209 of the housing wall 217 (toward the exterior of the terminal 200). In yet certain other embodiments, the threaded portion 211 of the housing wall 217 may be positioned partially within the interior of the terminal 211 (extending inwardly from the main body portion 209) and also extend partially outwardly toward the exterior of the terminal 200 from the main body portion 209.

Referring to FIGS. 5-7, since the terminals or enclosures 200 of the present disclosure may be outside rated environmentally sealed telecommunication enclosures having outside accessible fiber optic connector ports, the port-defining element 213 may define an outer connector port 216 that is configured for receiving a hardened fiber optic connector 240. The outer port 216 defined by the port-defining element 213 may be considered a hardened first port for receiving the hardened fiber optic connector 240, and the inner connector port 218 may be considered a non-hardened second interior port for receiving a second connector 228, wherein the second connector 228 may be a non-hardened connector located within the interior region of the main housing 202.

In certain embodiments, as noted above, a first cable 20 terminated to the hardened fiber optic connector 240 can be a drop cable routed to a subscriber premises and a second cable terminated to the non-hardened second connector 228 can be a stub cable 124 that is routed from the drop terminal to a fiber break-out location of a fiber distribution cable. With respect to the enclosures 200 of the present disclosure, the first cable 20 can be considered an external cable, such as a drop cable, and the second cable 124 can be considered an internal cable and can include a connectorized cable/fiber positioned within the network interface device. The first cable 20 is optically coupled to the second cable 124 when the connectors 240, 228 are positioned within their respective ports 216, 218 of the port-defining element 213.

As shown in FIGS. 5-7, the second connector 228 can be a conventional fiber optic connector such as an SC connector 229. One example of an SC connector 229 is illustrated and described at U.S. Pat. No. 5,317,663, which is hereby incorporated by reference in its entirety.

As noted above, in the depicted embodiment, the first connector 240 and the adapter 214 are considered hardened or ruggedized elements. By hardened or ruggedized, it is meant that first connector 240 and the adapter 214 are adapted for outside environmental use. For example, as discussed above, the first connector 240 and the adapter 214 can include environmental seals for preventing moisture/water intrusion. Also, it is preferred for the first connector 240 to be able to withstand a 100-pound axial pull-out force when coupled to the adapter 214.

The hardened fiber optic connector 240 is illustrated in isolation with the port-defining element 213 in FIG. 6, and it is illustrated with the non-hardened connector 228 in FIG. 7.

The hardened fiber optic connector 240 includes a connector housing 239 supporting a ferrule assembly 243. The connector housing 239 extends from a distal end 252 to a proximal end 254 (distal and proximal are defined with respect to the connection with the fiber optic cable 20 for the connector 240). The ferrule assembly 243 is adjacent the distal end 252 of the connector housing 239, and a strain relief boot 242 is mounted adjacent the proximal end 254 of the connector housing 239.

For each of the ports, the enclosure comprises a ferrule alignment sleeve 251 carried within the port-defining element 213. The ferrule alignment sleeve 251 has an outer end 253 for receiving a ferrule of the ferrule assembly 243 of the hardened fiber optic connector 240 when the hardened fiber optic connector 240 is inserted into the connector port 216. The ferrule alignment sleeve 251 has an inner end 255 for receiving a ferrule 257 of a non-hardened fiber optic connector 228 (e.g., SC format) located within the interior region of the main housing 202.

As illustrated in FIGS. 5-7, the port-defining element 213 also includes a first mechanical fastening structure 256 for mating with a corresponding second mechanical fastening structure 258 of the hardened fiber optic connector 240 to retain the hardened fiber optic connector 240 within the connector port 216. In certain embodiments, the first and second mechanical fastening structures 256, 258 may provide a twist-to-lock interface for retaining the hardened fiber optic connector 240 within the connector port 216. In certain embodiments, as depicted, the twist-to-lock interface may be provided by a threaded interface. In other embodiments, the twist-to-lock interface between the port-defining element 213 and the hardened fiber optic connector 240 may be a bayonet-style interface for retaining the hardened fiber optic connector 240 within the connector port 216.

Although in the foregoing description, terms such as "top," "bottom," "front," "back," "rear," "right," "left," "upper," or "lower" may have been used for ease of description and illustration, no restriction is intended by such use of the terms. The telecommunication devices described herein can be used in any orientation, depending upon the desired application.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention claimed is:

1. A telecommunication device comprising:
    a wall defining an opening that extends from a first side to a second side of the wall, the wall defining interior threads within the opening; and
    a port-defining element that mounts within the opening, the port-defining element defining exterior threads that are threadingly mated with respect to the interior threads to retain the port-defining element within the opening, the port-defining element defining a connector port for receiving a hardened fiber optic connector.

2. The telecommunication device of claim 1, wherein the port-defining element also includes a first mechanical fastening structure for mating with a corresponding second mechanical fastening structure of the hardened fiber optic connector to retain the hardened fiber optic connector within the connector port.

3. The telecommunication device of claim 2, wherein the first and second mechanical fastening structures provide a twist-to-lock interface for retaining the hardened fiber optic connector within the connector port.

4. The telecommunication device of claim 3, wherein the twist-to-lock interface is a bayonet-style interface or a threaded interface.

5. The telecommunication device of claim 1, wherein adhesive is provided between the exterior and interior threads.

6. The telecommunication device of claim 1, wherein a sealant is provided between the exterior and interior threads.

7. The telecommunication device of claim 1, further comprising a sealing element compressed between the port-defining element and the wall.

8. The telecommunication device of claim 7, wherein the sealing element is an o-ring compressed between the wall and an outer flange of the port-defining element.

9. The telecommunication device of claim 1, wherein friction-based interference sealing is used between the exterior threads of the port-defining element and the interior threads of the wall.

10. The telecommunication device of claim 1, further comprising a ferrule alignment sleeve carried within the port-defining element, the ferrule alignment sleeve having an outer end for receiving a ferrule of the hardened fiber optic connector when the hardened fiber optic connector is inserted into the connector port.

11. The telecommunication device of claim 10, wherein the ferrule alignment sleeve is a cylindrical split sleeve, and wherein the ferrule alignment sleeve has an inner end for receiving a ferrule of a non-hardened fiber optic connector located at the first side of the wall.

12. The telecommunication device of claim 1, wherein the port-defining element is threaded to the opening of the wall from the second side of the wall toward the first side of the wall.

13. The telecommunication device of claim 1, wherein the port-defining element is threaded to the opening of the wall from the first side of the wall toward the second side of the wall.

14. A telecommunication device comprising:
a wall defining an opening that extends from a first side to a second side of the wall, the wall including a main body portion and a threaded portion defining interior threads within the opening, wherein the main body portion and the threaded portion of the wall are integrally-formed; and
a port-defining element that mounts within the opening, the port-defining element defining exterior threads that are threadingly mated with respect to the interior threads to retain the port-defining element within the opening, the port-defining element defining a connector port for receiving a hardened fiber optic connector.

15. The telecommunication device of claim 14, wherein the main body portion and the threaded portion are non-movably bonded with respect to each other.

16. The telecommunication device of claim 14, wherein the main body portion and the threaded portion are molded as a single piece to form a monolithic construction.

17. The telecommunication device of claim 14, wherein friction-based interference sealing is used between the exterior threads of the port-defining element and the interior threads of the wall.

18. The telecommunication device of claim 14, wherein the port-defining element is threaded to the opening of the wall from the second side of the wall toward the first side of the wall.

19. The telecommunication device of claim 14, wherein the port-defining element is threaded to the opening of the wall from the first side of the wall toward the second side of the wall.

\* \* \* \* \*